United States Patent Office 3,131,993
Patented May 5, 1964

3,131,993
SOLVENT EXTRACTION PROCESS FOR THE RECOVERY OF VANADIUM FROM SOLUTIONS
Robert A. Gustison, Niagara Falls, Frank W. Hurd, White Plains, and Robert M. Fowler, Niagara Falls, N.Y., assignors to Union Carbide Corporation, a corporation of New York
No Drawing. Filed Feb. 24, 1956, Ser. No. 567,452
3 Claims. (Cl. 23—18)

This invention is concerned with a method for obtaining vanadium in the form of its pentoxide from an acid solution.

Vanadium pentoxide finds widespread utilization in the production of other vanadium compounds, and is the main source of vanadium metal itself. Vanadates prepared from vanadium pentoxide are used extensively in the manufacture of glass. Vanadium pentoxide currently is used as a catalyst in the cracking of petroleum and in the manufacture of sulfuric acid. Vanadium metal is extremely useful in titanium metallurgy, as it has the known effect of increasing hardness and tensile strength of titanium. Having a very low absorption of high energy neutrons, vanadium may also find extensive use in atomic reactors.

In the prior art vanadium has been separated from the metals with which it occurs by a complicated and expensive series of precipitations. Such techniques naturally have not been conducive to the production of high purity vanadium compounds at a low price, nor has it been economically feasible to utilize low grade sources of vanadium.

With a view to overcoming these prior art limitations, the primary object of the invention herein disclosed is to provide a high purity grade of vanadium pentoxide at a low price. A related object is to separate vanadium from iron, calcium, aluminum, molybdenum, silicon and titanium. A still further object is to obtain vanadium pentoxide from low grade sources of vanadium.

The method whereby these objects are attained is performed on the acid leach solution obtained, for example, from the conventional processes which are carried out on vanadiferous ore. This method consists of a liquid-liquid extraction in which tetravalent vanadium is extracted from the acid solution, the pH of which has been adjusted previously to a range of 0.6 up to the pH point at which vanadium will precipitate, by contacting it with an organic phosphate dissolved in a diluent. The vanadium is removed from the organic phase by treatment with an acid solution, and precipitated as a pentoxide by subsequent treatment.

In the practice of the invention, di-alkyl phosphates having a chain length of 6 to 15 carbon atoms are preferred, inasmuch as these have the most desirable solubility relationships between the aqueous and the organic phases as well as reactivity with vanadium. It is to be noted that a relationship exists between the amount of vanadium which dissolves in the organic solution and the concentration of phosphate utilized.

The diluent employed may be any water-immiscible organic liquid which will dissolve the organic phosphate. Liquids found suitable in the practice of the invention include light petroleum distillates, gasoline, kerosene and fuel oils.

Prior to treatment by the method of this invention, a typical vanadium-bearing acid liquor may have a pH varying from 0.05 up to any pH at which vanadium will not precipitate, and may contain various amounts of iron, aluminum, calcium, silicon, molybdenum and titanium, as well as minor percentages of numerous other elements. In practice, the quinquavalent vanadium and trivalent iron are reduced with sulfur dioxide or other conventional reducing agents until a negative result is obtained on testing for ferric iron. The pH is then adjusted to the desired level. At this point the thus treated solution is agitated with a second solution consisting of an organic phosphate dissolved in a diluent. The organic phosphate reacts with vanadium to form a complex which dissolves in the organic phase, leaving gangue material in the aqueous solution. The organic solution and the original aqueous solution subsequently are physically separated.

The organic phase containing the vanadium may then be treated in one of several ways to recover the vanadium. The preferred method of transferring the vanadium from the organic phase back to an aqueous phase for final recovery of the vanadium is by contacting the extract with a string acid such as $HNO_3$, $HCl$ or $H_2SO_4$. Two alternative methods may be employed to obtain precipitated $V_2O_5$ from the acid solution. In the first, the aqueous solution may be oxidized with a suitable oxidizing agent, such as hydrogen peroxide, chlorine, sodium chlorate, chromic acid, or the nitrate ion in the nitric acid, and the $V_2O_5$ precipitated by evaporation or pH adjustment of the oxidized solution. Similarly the organic phase can be contacted with an aqueous phase containing an oxidizing agent. Alternatively, the aqueous solution first may be evaporated to recover the dried vanadium salts, which may be then oxidized with pure oxygen or roasted in air or with steam. In any case, the resultant material will be pure $V_2O_5$.

In certain instances the desired end product may be a vanadate, such as sodium or lead vanadate, in which case a strong alkaline solution (i.e. pH range 10 to 14) may be employed instead of an acid solution to strip the vanadium from the organic phosphate.

The purity of the vanadium pentoxide obtained as outlined above can attain 99.9 percent. This extremely high purity makes vanadium pentoxide prepared by the method of the invention very attractive for the production of vanadium metal for use in atomic reactors, where minute quantities of certain impurities will greatly increase the neutron absorption rate of the metal, and render it unsuitable.

To illustrate the invention, its method was carried out on a leach solution having a pH of 1.2 and the following analysis.

| | G./liter |
|---|---|
| V | 2.4 |
| Ca | 0.9 |
| Mg | 0.8 |
| Fe | 1.0 |
| Al | 2.5 |
| Si | 0.6 |
| N | 0.13 |
| P | 0.03 |
| S | 5.3 |
| Cl | 3.85 |

Ten liters of this solution were treated with sulfur dioxide until it no longer showed the presence of the ferric ion. Ammonia was then passed through the solution until the pH was 2. Vanadium was extracted from the treated liquor by a three stage extraction process, using an 0.4 molar solution of di-2-ethyl-hexyl phosphoric acid in kerosene, the volume ratio of the organic to the aqueous solutions used being 0.31 to 1. In each stage the liquids were shaken up together for two minutes, allowed to settle for one minute, and the aqueous layer then run off from the bottom of the mixing vessel. The combined organic phases showed a vanadium content of 7.75 grams per liter, and only slight traces of the other elements. The raffinate, which contained silicon, iron, aluminum, calcium, molybdenum and titanium, had a vanadium content of 0.025 gram per liter.

The organic phase was then contacted with 7 percent nitric acid for two minutes to strip the vanadium from the solvent. The mixture was allowed to stand for one minute, and the aqueous layer containing vanadium was separated. This solution was evaporated to approximately 15 percent of its original volume and the vanadium was thereby precipitated as vanadium pentoxide. The vanadium pentoxide thus obtained had a purity of 99.95 percent, while the percentage recovery of vanadium from the original liquor was 99 percent.

As an example of a further embodiment of the invention wherein evaporation of the acid phase containing vanadium precedes the oxidation step, the organic phase of a solution having substantially the same composition as that of the previous example, was treated with a (12 M) solution of HCl. After this treatment and separation of the organic and acid layers, the vanadium was present in hydrochloric acid. This hydrochloric acid solution was evaporated to dryness and calcined in air at 550° C. The product contained less than 0.02 percent chloride.

As a further example of the method of this invention, sulfuric acid (2 N) was used to strip vanadium from the organic phase. This solution was evaporated to dryness and calcined in air at 800° C. The product contained about 0.2 percent of sulfur. In a modification of the above example, the pH of a sulfate solution containing quadrivalent vanadium was adjusted to a value between 1 and 2, and chlorine gas was passed through to precipitate pure vanadium pentoxide.

In addition to the advantages of the present invention already mentioned, its practice requires only very simple apparatus. For large scale operations, the extraction may be performed in continuous columns or tanks equipped with one or more agitators. Physical separation of the organic and aqueous phases then can be effected by gravity.

What is claimed is:

1. A method of extracting vanadium from an aqueous acid solution of a vanadiferous ore comprising reducing substantially all of the vanadium present in said aqueous solution to the tetravalent state by passing sulphur dioxide therethrough; adjusting the pH values of said solution to 2 by passing ammonia therethrough; intimately contacting each volume of said solution with approximately 0.31 volume of an approximately 0.4 molar organic solution of di-2-ethylhexyl phosphoric acid dissolved in kerosene, whereby at least a substantial portion of said vanadium is transferred to said organic solution; separating the organic solution from the aqueous solution; intimately contacting said organic solution with an aqueous solution comprising approximately 7 percent nitric acid whereby said vanadium is transferred to said stripping solution; separating the stripping solution from said organic solution; and evaporating the stripping solution to approximately 15 percent of its original volume to precipitate vanadium pentoxide therefrom.

2. A method of extracting vanadium from an aqueous acid solution containing vanadium, iron, calcium, aluminum, molybdenum and titanium comprising reducing substantially all of the vanadium present in said aqueous solution to the tetravalent state by passing sulphur dioxide therethrough; adjusting the pH values of said solution to 2 by passing ammonia therethrough; intimately contacting each volume of said solution with approximately 0.31 volume of an approximately 0.4 molar organic solution of di-2-ethylhexyl phosphoric acid dissolved in kerosene, whereby at least a substantial portion of said vanadium is transferred to said organic solution; separating the organic solution from the aqueous solution; intimately contacting said organic solution with an aqueous solution comprising approximately 7 percent nitric acid whereby said vanadium is transferred to said stripping solution; separating the stripping solution from said organic solution; and evaporating the stripping solution to approximately 15 percent of its original volume to precipitate vanadium pentoxide therefrom.

3. A process for recovering vanadium values from acidic aqueous solution comprising solvent extracting an acidic aqueous solution containing tetravalent vanadium having a pH of about 2 with an extractant comprising a solution of di-2-ethyl hexyl hydrogen phosphate in a substantially water immiscible inert organic liquid carrier and separating the resulting vanadium containing extractant from the solvent extracted aqueous solution.

References Cited in the file of this patent

UNITED STATES PATENTS

| 1,621,038 | Thews | Mar. 15, 1927 |
| 2,202,525 | Hixson et al. | Mar. 28, 1940 |
| 2,211,119 | Hixson et al. | Aug. 13, 1940 |
| 2,227,833 | Hixson et al. | Jan. 7, 1941 |
| 2,796,320 | Spedding et al. | June 18, 1957 |
| 2,859,092 | Bailes et al. | Nov. 4, 1958 |
| 2,860,031 | Grinstead | Nov. 11, 1958 |

OTHER REFERENCES

Ellis et al.: U.S. Atomic Energy Commission Publication DOW 131, declassified September 29, 1955, 104 pages.

Bailes (A): U.S. Atomic Energy Commission Publication DOW 116, June 1, 1954, 49 pages.

Bailes (B): U.S. Atomic Energy Commission Publication DOW 120, July–August 1954, 71 pages.

Bailes (C): U.S. Atomic Energy Commission Publication DOW 114, April 1, 1954, 36 pages.

Bailes (D): U.S. Atomic Energy Commission Publication DOW 115, May 1, 1954, 52 pages.

Dedication 3,131,993.—*Robert A. Gustison*, Niagara Falls, *Frank W. Hurd*, White Plains, and *Robert M. Fowler*, Niagara Falls, N.Y. SOLVENT EXTRACTION PROCESS FOR THE RECOVERY OF VANADIUM FROM SOLUTIONS. Patent dated May 5, 1964. Dedication filed April 22, 1964, by the assignee, *Union Carbide Corporation*.

Hereby dedicates said patent to the public.

[*Official Gazette, October 6, 1964.*]